United States Patent [19]

D'Aurelio

[11] Patent Number: 5,220,348
[45] Date of Patent: Jun. 15, 1993

[54] ELECTRONIC DRIVE CIRCUIT FOR MULTI-LASER THERMAL PRINTER

[75] Inventor: David P. D'Aurelio, Hilton, N.Y.
[73] Assignee: Eastman Kodak Company, Rochester, N.Y.
[21] Appl. No.: 749,059
[22] Filed: Aug. 23, 1991
[51] Int. Cl.[5] .......................................... G01D 15/10
[52] U.S. Cl. ............................ 346/76 L; 346/107 R
[58] Field of Search ............... 346/107 R, 108, 76 L, 346/76 PH

[56] References Cited

U.S. PATENT DOCUMENTS

| | | | |
|---|---|---|---|
| 4,878,072 | 10/1989 | Reinten | 346/107 R |
| 4,885,597 | 12/1989 | Tschang et al. | 346/107 R |
| 4,897,672 | 1/1990 | Horiuchi et al. | 346/107 R |
| 4,982,203 | 1/1991 | Uebbing et al. | 346/107 R |
| 4,998,118 | 3/1991 | Ng | 346/107 R |
| 5,016,027 | 5/1991 | Uebbing | 346/107 R |

*Primary Examiner*—A. T. Grimley
*Assistant Examiner*—William J. Royer
*Attorney, Agent, or Firm*—Robert L. Randall

[57] ABSTRACT

There is disclosed an automatically adjustable electronic drive circuit for a multi-laser thermal-printer to insure uniformity in printing by all of the lasers. Each circuit includes a semi-conductor diode laser, a power transistor for driving the laser, a light sensor, a current sensor, a digitally adjustable potentiometer bias level unit, a dual input power amplifier for driving the power transistor, and two D/A converters for applying threshold and enable (full-on) signal levels to the inputs of the power amplifier. A first data feedback loop from a laser current monitor through an external central processor unit (CPU) to one of the D/A converters sets the threshold drive current to the laser. A second data feedback loop from the light sensor through the CPU and the adjustable bias unit to the second D/A converter establishes the level of the enable drive current to the laser to obtain a precisely calibrated full-on light power output of the laser. This circuit is periodically re-calibrated such that the laser light power output level remains constant for a given data command throughout the service life of the laser in spite of ageing. All of the light power output levels for the multiple lasers in the printer are calibrated to the same light power output level (within a narrow range) for a given data command.

13 Claims, 3 Drawing Sheets

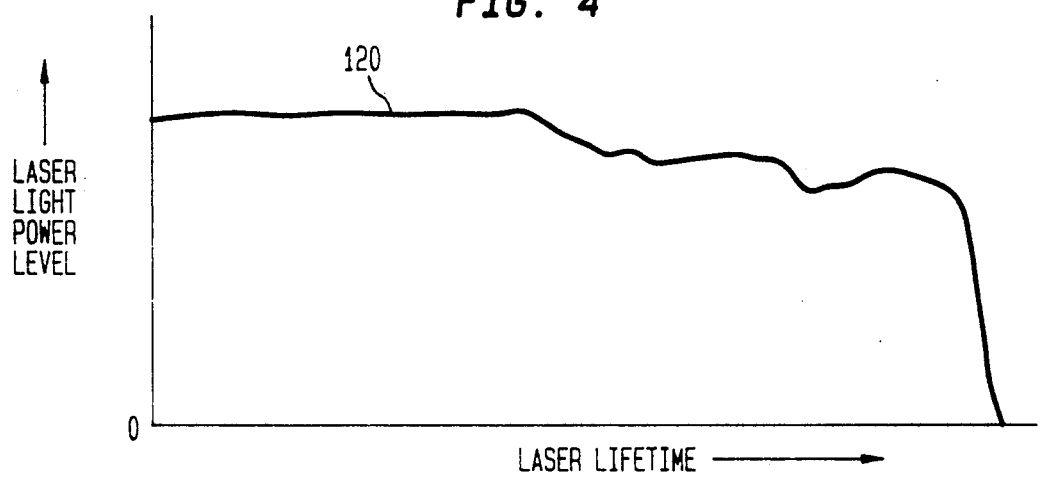
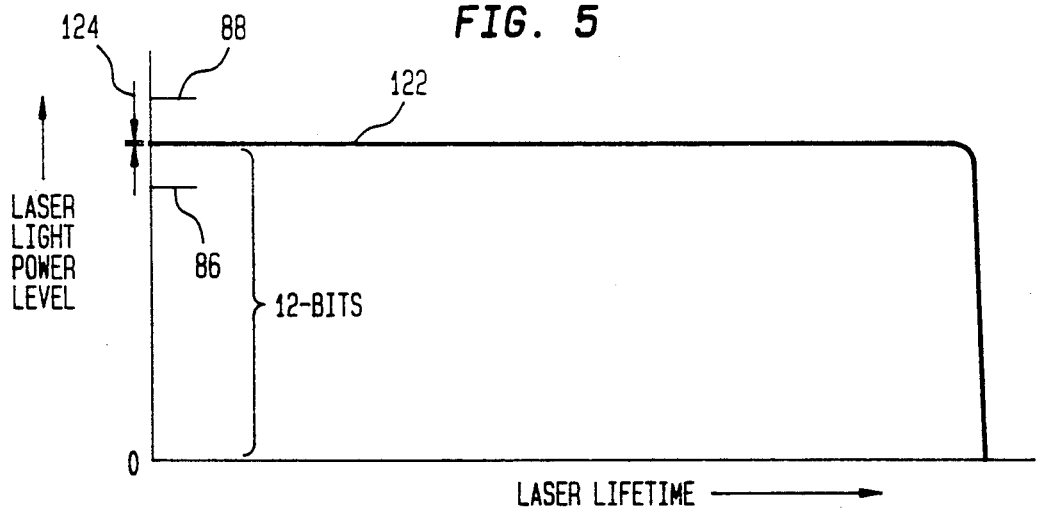

ELECTRONIC DRIVE CIRCUIT FOR MULTI-LASER THERMAL PRINTER

FIELD OF THE INVENTION

This invention relates to an electronic drive circuit for a multi-laser thermal printer and, more particularly, to an automatically adjustable electronic drive circuit for each individual laser of the printer such that all of the lasers during their service lifetimes print with substantially the same density for the same input data.

BACKGROUND OF THE INVENTION

One type of thermal printer employs a dye-donor element placed over a dye-receiver element. The two elements together are moved past a print head having a plurality of very small heat "sources". When a particular heating source is energized, thermal energy from it causes a small dot or pixel of dye to transfer from the dye donor element onto the receiver element. The density of each dye pixel is a function of the amount of energy delivered from the respective heating source of the print head to the dye donor element. The individual pixels are printed in accordance with image data; all of the dye pixels thus formed together define the image printed on the receiver element.

Because light from a laser can be focused to an ultra-fine, intense spot of heat power and can be modulated at very high speed, lasers (such as small, relatively inexpensive diode lasers), are now the preferred heating sources for printing the dye pixels in the more advanced thermal printers. But in the case where pixels are printed at very fine pitch on very closely spaced lines (e.g., 1800 lines per inch and 1800 pixels per inch), it becomes impracticable to provide an individual laser for each line across the width of a page being printed. For example, a 10 inch wide page would require 18,000 lasers along with their respective drive circuits! On the other hand, using only one laser and scanning the lines across a page in sequence to print an image is a very much slower operation than when multiple lasers are used.

In U.S. patent application Ser. No. 451,655, filed Dec. 18, 1989, entitled "Thermal Printer", and assigned to an assignee in common with the present patent application, there is disclosed a thermal printer employing a plurality of lasers for printing a like plurality of lines of print pixels at the same time. This thermal printer produces full color pictures printed by thermal dye transfer in accordance with electronic image data corresponding to the pixels of a master image. The pictures so produced have ultra-fine detail and faithful color rendition which rival, and in some instances exceed in visual quality, large photographic prints made by state-of-the-art photography. This thermal printer is able to produce either continuous-tone or half-tone prints In the continuous tone mode, the ultra-fine printed pixels of colored dye have densities which vary over a continuous tone scale in accordance with the image data. On the other hand in the half-tone mode, the ultra-fine print pixels which define the picture are formed by more or fewer micro-pixels of dye such that the pixels printed closely together appear to the eye as having greater or lesser density and thus simulate a continuous tone scale. Half-tone, offset printing is widely used for example, in printing and publishing. It is common practice in this and related industries first to obtain and visually inspect "proof" prints prior to production so that any visual blemishes, artifacts of the half-tone process, or other undesirable qualities in the "printed" pictures, (which would otherwise occur in production) can be corrected before production begins In the past, the obtaining of these "proof" prints has involved considerable time delay and significant extra expense. This thermal printer, by virtue of its unique design and mode of operation is able to produce quickly (within minutes) an authentic half-tone printed image which (for all intents and purposes) is visually indistinguishable from the highest quality color image made by offset printing. And by comparison, the initial setup costs and processing times for the printing plates required in high quality offset printing are many times (e.g., hundreds) the costs and times required by this thermal printer to produce "proof" prints of equal quality. This not only simplifies the publishing operation prior to production, but helps a publisher improve the visual quality of the end product (e.g., an illustrated magazine).

The human eye is extremely sensitive to differences in tone scale, to apparent graininess, to color balance and registration, and to various other incidental defects (termed printing artifacts) in a picture which may occur as a result of the process by which the picture is reproduced. Thus it is highly desirable for a thermal printer such as described above, when used in critical applications, to be as free as possible from such printing artifacts.

The thermal printer described in the above-mentioned U.S. Patent Application has a rotating drum on which can be mounted a print receiving element with a dye donor element held closely on top of it. The two elements are in the form of thin flexible rectangular sheets of material mounted around the circumference of the drum. As the drum rotates, a thermal print head, with individual channels of laser light beams in closely spaced, ultra-fine light spots focused on the dye element, is moved in a lateral direction parallel to the axis of the drum. With each rotation of the drum, multiple lines (termed a "swath") of micro-pixels are printed on the receiving element in accordance with line data applied to the electronic driving circuits of the respective laser channels. There are as many lines printed in a swath as there are laser channels (for example, 20 lines with a lateral spacing of 1800 lines per inch) and there are as many swaths (with "seamless" or invisible overlapping) as required to print an image of a given page width. It has been found, however, that even minute differences in the light output intensity levels of the individual lasers (where supposedly equal light intensities are called for by the same image data) can cause objectionable visual differences in the densities of the micro-pixels printed by the individual laser channels. Light power differences as seemingly unimportant as a small fraction of one percent of a desired laser output power level are visually noticeable as density variations of the printed pixels. It is highly desirable to be able to quickly and easily adjust precisely the light intensity of each laser so that all of the laser channels, for a given data command, print uniformly.

Semiconductor diode lasers, such as used in the thermal printer described above, operate (when on) at relatively high temperatures. Though the lifetime of such a laser is relatively long (thousands of hours), because of operating environment and other factors, a laser's light output power changes (sometimes erratically) as ageing progresses. Thus even though the lasers in a given printer are initially adjusted to give exactly the same light power output level, because of subsequent ageing of the lasers, their individual light power levels inevitably change slightly resulting in cumulatively diverging power levels. These cumulative changes, even though slight, degrade the high quality of the images printed. Thus, at some point, it becomes necessary to re-adjust and accurately calibrate some or all of the lasers so that they again print within a desired degree of uniformity (e.g., a small fraction of one percent). In the past such re-adjustments and calibrations have been tedious and time-consuming operations. It is doubly difficult in the field where a thermal printer is in use. Moreover, the problem is compounded in a thermal printer which employs a larger rather than a fewer number of lasers so that more lines are printed at once and the complete printing of an image takes less time.

The present invention provides a simple, automatic, and highly cost effective solution to this problem of keeping the multiple lasers of a thermal printer operating with near perfect uniformity throughout their lifetimes.

SUMMARY OF THE INVENTION

There is provided according to the invention an electronic drive circuit for a laser (and its respective laser line-printing channel) in a multi-laser thermal printer to insure uniformity in printing of all of the lasers. The circuit comprises a semi-conductor diode laser, a power transistor for driving the laser with current, a light sensor, a current monitor, a digitally adjustable potentiometer and bias level unit, a dual input power amplifier for driving the power transistor, and two D/A converters for applying threshold and enable (full-on) signal levels respectively to the two inputs of the power amplifier. A first data feedback loop from the laser current monitor, through a separately provided central processor unit (CPU), to one of the D/A converters establishes the threshold drive current to the laser. A second data feedback loop from the light sensor through the CPU and the adjustable bias unit to the second D/A converter establishes the level (within upper and lower limits) of the enable drive current to the laser to obtain a precisely calibrated full-on light power output of the laser. This circuit is periodically re-calibrated by means of the feedback loops such that the laser light full-on power output level remains constant, for a given data command, throughout the service life of the laser in spite of ageing. All of the light output levels for the multiple lasers in the printer (and their respective laser channels), are calibrated to the same intensity or power output level (within a narrow range) for a given data command. Thus the multiple lasers of the printer print with uniform density regardless of small differences amongst the lasers and their respective drive circuits.

A better understanding of the invention, together with its important advantages will best be gained from a study of the following description given in conjunction with the accompanying drawings and claims.

BRIEF DESCRIPTION OF THE DRAWINGS

FIG. 4 is a graph (not to scale) showing variations in laser light power level with constant full-on drive current for a given laser during its service lifetime; and FIG. 5 is a graph (not to scale) showing how the present invention effectively maintains the full-on laser light power level at a desired value of intensity for a given data word, during the lifetime of the laser.

DETAILED DESCRIPTION

Figure 1:
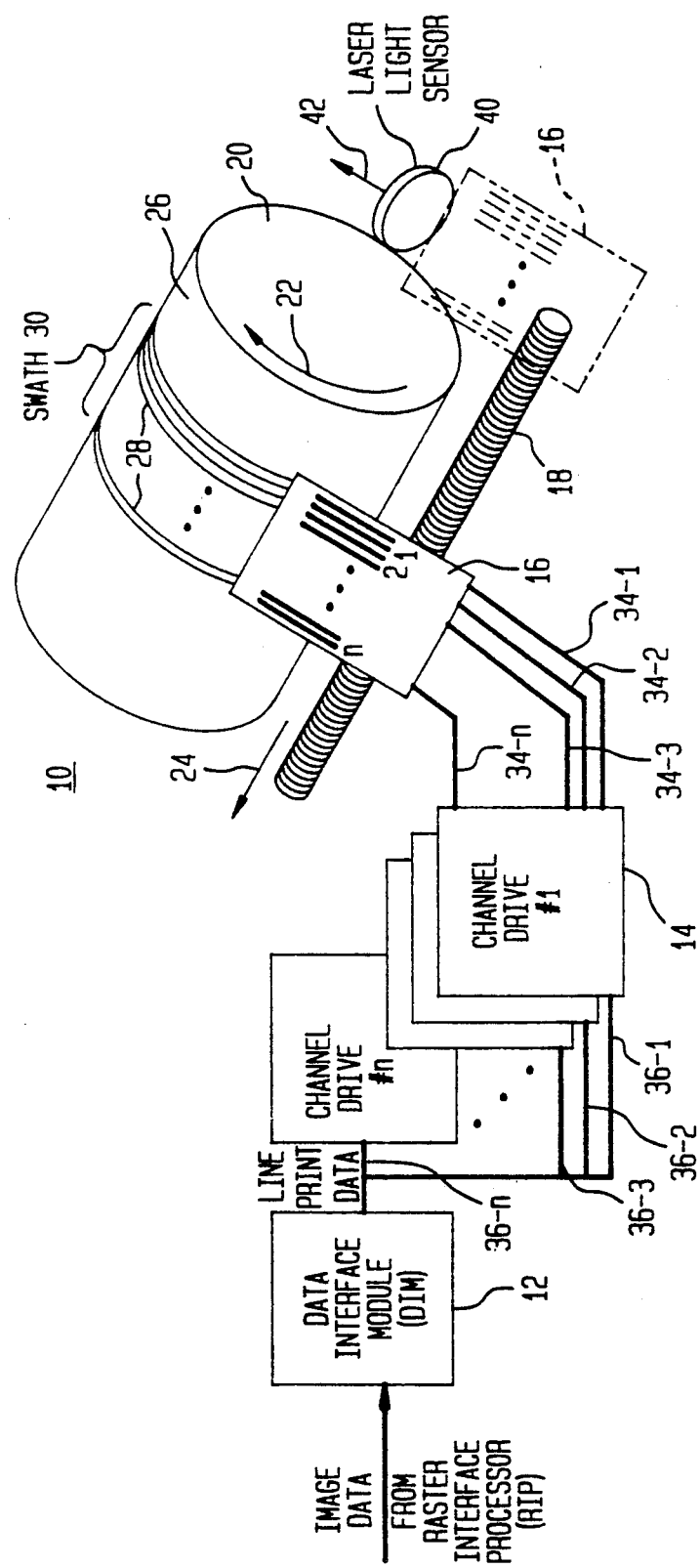
FIG. 1 is a schematic block diagram of a multi-laser thermal printer embodying features of the invention.

Referring now to FIG. 1, there are schematically shown in block diagram form elements of a thermal printer 10. These elements comprise a data interface module (DIM) 12, a plurality of laser channel drive circuits 14, respectively indicated as "1" through "n", and a multi-laser print head 16. The print head 16, which has a like plurality of laser channels "1" through "n", is mounted on a feed screw 18, which is mounted on a frame (not shown) closely parallel to a print drum 20 which is also mounted on the frame. During operation of the printer 10, the drum 20 rotates in the direction of a curved arrow 22 and the feed screw 18 drives the print head slowly in the direction of an arrow 24. Mounted on the surface 26 of the drum 20 are a dye receiving element (not shown) and a dye donor element (also not shown) held closely on top of it. The two elements are in the form of thin flexible rectangular sheets of material held around a surface 26 of the drum and extending along its length. As the drum 20 rotates in the direction of the curved arrow 22, the thermal print head 16, with its individual laser channels "1" through "n", shines light beams in closely spaced, ultra-fine light spots focused on the dye element. The print head 16 moves slowly parallel to the axis of the drum 20 in the direction of the arrow 24. With each rotation of the drum 16, a plurality of lines, indicated at 28, of micropixels are printed on the receiving element in accordance with image line or print data applied to the electronic drive circuits 14 of the respective laser channels "1" through "n". There are as many print lines 28 as there are laser channels and these lines together form a swath 30. For the sake of illustration, only one such swath 30 is shown (not to scale), but it is to be understood that there are as many swaths 30 printed side-by-side (with invisible over-lapping) in the direction of the arrow 24 as required to print an image of a given page width.

The laser channels "1" through "n" of the print head 16 are coupled to the respective channel drive circuits 14 by a like plurality of fiber optic links 34-1 through 34-n respectively, with just 34-1, 34-2, 34-3 and 34-n being shown. This print head, the fiber optic links and their respective lasers are described in more detail in the above-mentioned U.S. Patent Application. Each channel drive circuit 14 ("1" through "n") is supplied with line print data from the DIM 12 by a respective one of the data busses 36-1 through 36-n, with just 36-1, 36-2, 36-3 and 36-n being shown. The DIM 12 is supplied with image data from a raster image processor (RIP) which is not shown.

Mounted to the right of the drum 20 in fixed relation on the frame (not shown) is a laser-light sensor 40 which will be described in greater detail shortly. Output signals from the sensor 40 are applied to a lead 42. When the laser channels "1" through "n" of the print head 16 are to be calibrated, the print head 16 is moved to the right along the feedscrew 18 into close proximity to the sensor 40, as indicated by the dotted outline of the head 16. In this position the output light intensity of each of the laser channels "1" through "n" is very accurately measured, and can be re-calibrated as needed.

Figure 2:
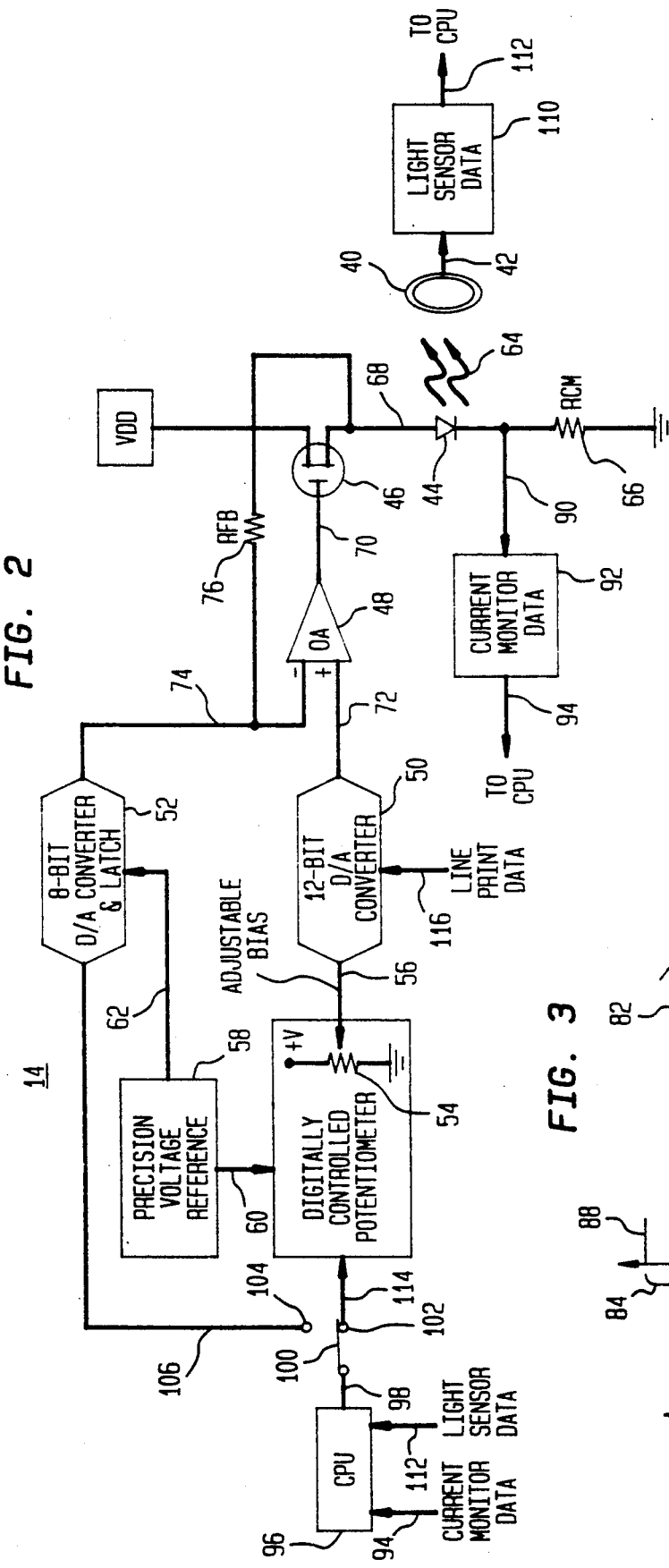
FIG. 2 is a block diagram of an electronic laser drive circuit provided according to a preferred embodiment of the invention.

Referring now to FIG. 2, there is shown in block diagram form a single one of the channel drive circuits 14 provided according to a preferred embodiment of the invention. The circuit 14 comprises a semiconductor diode laser 44, a power drive transistor 46, a high speed, power operational amplifier (OA) 48, a 12-bit digital to analog (D/A) converter 50, and an 8-bit D/A converter and latch unit 52. A digitally controlled potentiometer 54 provides a precisely adjusted bias voltage to the D/A converter 50 via a lead 56. A precision voltage reference source 58 applies a reference voltage (+V) via a lead 60 to the potentiometer 54, and applies via a lead 62 a reference voltage to the D/A latch unit 52.

The diode laser 44, when on, emits a light beam, indicated by the double curved arrows 64. As schematically shown here, the laser 44 (which actually energizes a respective one of the laser channels of the print head 16 via a fiber optic link, as explained above) is positioned so that its light beam 64 impinges on the sensor 40 (see also FIG. 1). One side of the laser 44 is in series with a current-monitor resistor (RCM) 66 connected to ground; the other side of the laser 44 is connected by a lead 68 in series with the drain-source electrodes of the power transistor 46 (shown as a field effect transistor) and a positive supply voltage VDD. A control electrode (gate) of the transistor 46 is connected via a lead 70 to the output of the amplifier 48. A lower (positive (+)) input of the amplifier 48 is connected via a lead 72 to an output of the D/A converter 50. An upper (negative (−)) input of the amplifier 48 is connected via a lead 74 to an output of the D/A latch unit 52. A feedback resistor (RFB) 76 is connected between the leads 74 and 68. The power transistor 46 applies various levels of drive current to the laser 44 in accordance with signals on the lead 70 from the amplifier 48.

Figure 3:
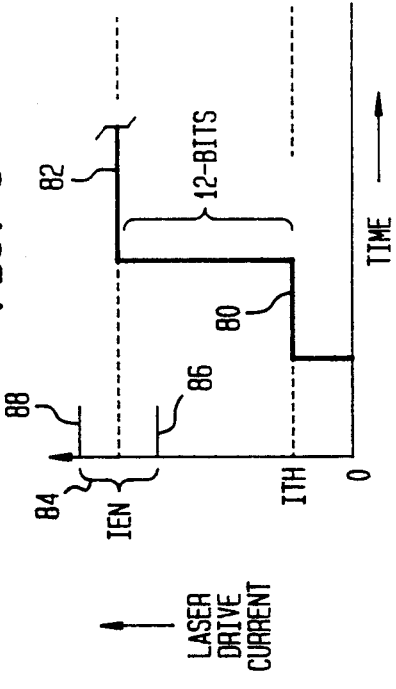
FIG. 3 is a graph (not to scale) showing increasing laser drive current and the corresponding laser light power levels or intensities.

Referring now to FIG. 3, there is shown a graph (not to scale) relating laser drive current (vertical axis) with time (horizontal axis) to the light power (intensity) levels produced by the laser 44. At a threshold current level "ITH" for the drive current supplied by the power transistor 46 to the laser 44, the laser light output is "off" (just below "on") as indicated by the horizontal line 80. Thereafter, when the laser drive current is increased to an "enable" (full-on) value "IEN", the laser light intensity is full-on, as indicated by the horizontal line 82. The enable current IEN, which produces the light intensity level 82, is not the same from one laser to another, and does not remain constant for a given laser during its service life. Thus the enable current IEN is indicated by a bracket 84 as having a lower value 86 and an upper value 88 corresponding to the light intensity level 82. The laser is "on" for a time corresponding to the duration of the drive current (e.g., IEN) from the power transistor 46. The difference between the intensity level 80 (just below "on") and the intensity level 82 (full-on) is shown schematically represented by a 12-bit binary number (as used in the 12-bit D/A converter 50). Light level 80 (just below "on") is set by threshold current ITH which in turn is set by a steady-state signal from the 8-bit D/A latch unit 52 to the power amplifier 48. Light level 82 (full-on) is held constant at a precisely measured value by adjustment of the current IEN within the range from the lower value 86 to the higher value 88. The light intensity of a laser may be modulated in accordance with the weighted value of the 12-bit number.

Referring again to FIG. 2, the threshold current ITH supplied by the power transistor 46 to the laser 44 is set at the desired value (see FIG. 3) by the 8-bit D/A converter and latch unit 52. The feedback resistor (RFB) 76 insures that the threshold current remains constant so long as a steady voltage signal (which determines this threshold current level) from the 8 bit D/A latch unit 52 via the lead 74 is applied to the power amplifier 48. The amplifier 48 in turn drives the power transistor 46 via the lead 70.

Current which drives the laser 44 is monitored by the RCM resistor 66 which is typically a precision value, low ohmage resistor. The voltage drop across the resistor 66 is applied via a lead 90 to a current monitor data unit 92 which converts the voltage drop across the resistor 66 into corresponding current monitor binary data. This data is applied via a lead 94 to an input of a central processor unit (CPU) 96, which is separate from the drive circuit 14. The output of the CPU 96 via a lead 98 is applied to a switch 100. The switch 100 selectively applies data signals from the CPU 96 to a lower terminal 102 or to an upper terminal 104. With the switch 100 connected between the lead 98 and the upper terminal 104, data signals from the CPU 96 are applied via a lead 106 to an input of the D/A latch unit 52. The output voltage of the 8-bit D/A latch unit 52 (on lead 74) is thus determined by the data signals of the feedback loops comprising the lead 106, the CPU 96, the lead 94, and the current monitor data unit 92. Once the 8 bit D/A converter and latch 52 has been set to give a desired steady value of threshold current ITH, the switch 100 is connected to the lower terminal 102. Thereafter, the threshold drive current ITH to the laser 44 remains precisely set at the desired value until subsequently reset.

Analog signals from the light sensor 40 corresponding to the light intensity from the laser 44 are applied via the lead 42 to a light sensor data unit 110 which converts these signals to digital light sensor data and applies this data via a lead 112 to another input to the CPU 96. The CPU 96 generates, in accordance with a known algorithm, binary signals which are applied (via the lead 98, the switch 100, the terminal 102, and a lead 114) to the digitally controlled potentiometer 54. The digital data from the CPU precisely adjusts the potentiometer 54 and sets the corresponding adjustable bias level applied to the lead 56 and to the 12-bit D/A converter 50. The data feedback loop from the light sensor 40 through the CPU 96 and the potentiometer 54 precisely sets an internal voltage level of the 12-bit D/A converter 50. Thus for a given data command (line print data) applied to the 12-bit D/A converter 50 via a data buss 116 (corresponding to one of the data busses 36-1 through 36-n of FIG. 1), the 12-bit D/A converter 50 drives the amplifier 48 with an analog signal which produces a precisely determined laser light intensity (as measured by the light sensor 40). Setting the bias level on the lead 56 in effect adjusts the gain of the 12-bit D/A converter 50. As a result, for line print data input on the buss 116 to the 12-bit D/A converter 50 calling for full-on laser output power or light intensity corresponding to the calibrated level 82 (FIG. 3), the power transistor 46 supplies the necessary drive current IEN within the range 84 (FIG. 3). A potentiometer 54 in a different drive circuit 14 (for a different laser 44) may be set differently to obtain the same output light intensity for the same data command, as was explained above. The potentiometer 54 in a given circuit 14 is periodically reset (which resets the enable drive current IEN) to adjust the light output power of the laser 44 to produce the desired full-on light intensity level 82 (see FIG. 3). Thus by periodic adjustments of the threshold current ITH and of the enable current IEN, the laser 44 produces a precisely calibrated light intensity corresponding to line print data applied by the buss 116 to the 12-bit D/A converter 50. The precision voltage reference unit 58 is accurate to 0.1% and is temperature compensated so that each circuit 14 operates with the same precision and accuracy of the others in driving its respective laser 44.

Referring now to FIG. 4, there is shown schematically (not to scale) a graph having a line 120 which shows, for a constant enable drive current IEN (see FIG. 3), the light output power level of a laser 44 (vertical scale) as a function of the laser's service life (horizontal scale). The zero laser output level corresponds to a threshold drive current ITH It will be seen that the line 120 varies, sometimes erratically, and that the light power level generally declines with increasing age of the laser. The line 120 for a different laser 44 may be different.

Referring now to FIG. 5, there is shown schematically (not to scale) a graph of a line 122 which shows laser output power level corresponding to a desired full-on intensity level 82 (FIG. 3) for a laser used with the circuit 14 of the present invention. This power level 122 during the service life of a laser 44 is held within very close limits as indicated by the vertical arrows 124, in spite of ageing of the laser 44 (see FIG. 4). This is achieved by periodic re-setting of the enable current IEN (FIG. 3) within the lower and upper enable current limits 86 and 88. Thus after the threshold and enable currents ITH and IEN are adjusted and set or re-set, as explained above, the same 12-bit word within a 12-bit D/A converter 50 (which may be differently biased from the converter 50 of one circuit 14 to that of another circuit 14) produces the uniform laser light power level indicated by the line 122 throughout the service life of a laser 44. The power level line for a different laser 44 is substantially like the power level line 122 and lies within the narrow range indicated by the arrows 124.

After the respective power levels of the laser channels have been calibrated and set, as explained above, the print head 16 is moved back into printing position (FIG. 1). Because the light sensor 40 is mounted within the printer 10, there is no need to remove the print head 16 in order to calibrate its respective laser channels. The calibration of each channel is very precise and remains accurately set. The CPU-controlled automatic setting of the threshold and enable drive currents for each laser 44, as explained above, makes this operation fast and extremely accurate even though a considerable number of laser channels (e.g., 20) may be involved. The digitally controlled potentiometer 54 is commercially available as part number X9103. The light sensor is commercially available as part number SD444-4141-261. By virtue of the present invention, a larger number of laser channels than previously used may be employed in a thermal printer while still obtaining images of highest quality.

It is to be understood that the embodiment of an electronic drive circuit for a thermal printer described herein is illustrative of the general principles of the invention. Modifications may readily be devised by those skilled in the art without departing from the spirit and scope of the invention. For example, the invention is not limited to a particular number of laser channels or to particular part numbers for the digitally controlled potentiometer, or for the light sensor.

What is claimed is:

1. A drive circuit for a laser in a multi-laser thermal printer, the drive circuit comprising:
   a laser;
   power drive means for driving the laser with current, the current being changeable from a threshold level where the laser is off to an enable level where the light output power level of the laser has a calibrated full-on value;
   current monitor means for determining the current to the laser;
   light sensor means for accurately measuring and calibrating the light output power of the laser;
   first feedback means from the current monitor means back to the power drive means for setting the threshold current at a desired level;
   line data means for supplying input data to the power drive means; and
   second feedback means from the light sensor means back to the power drive means for setting the enable current level in accordance with a calibrated value for a given line data command, such that the full-on laser output power level is kept substantially constant in spite of ageing of the laser.

2. The drive circuit of claim 1 in combination with a plurality of like circuits, the full-on laser output power levels of all of the circuits being kept within a narrow range throughout the service life of the printer such that the multiple lasers all print with highly uniform densities in spite of ageing.

3. The drive circuit of claim 1 wherein the power drive means comprises a power transistor for supplying current to the laser; a power amplifier for controlling the current of the power transistor, the power amplifier having two inputs; a first D/A converter for applying a settleable steady-state voltage to one input of the power amplifier in accordance with a desired threshold current of the power transistor to the laser; and a second D/A converter for applying signals to the other input of the power amplifier in accordance with a desired drive current by the power transistor to the laser.

4. The drive circuit of claim 3 wherein the first D/A converter is adjustably set by the first feedback means.

5. The drive circuit of claim 3 wherein the second D/A converter is adjustably biased by the second feedback means.

6. The drive circuit of claim 5 wherein the second feedback means includes a digitally controlled potentiometer which biases the second D/A converter.

7. The drive circuit of claim 6 wherein the second D/A converter has its adjustable bias voltage referenced to a precision voltage reference source, and the first D/A converter has its settleable steady-state voltage also referenced to the precision source.

8. A multi-laser thermal printer comprising:
   a print head having a plurality of laser channels for printing a like plurality of lines of an image on a thermal print medium;
   a laser-light sensor mounted in proximity to the print head for measuring the light output of each of the laser channels; and a plurality of electronic drive circuits for driving the respective laser channels, each drive circuit comprising:

a laser for supplying light to a respective one of the laser channels;

power means for supplying drive current to the laser, the power means operating between a threshold current level and an enable current level, the power means having a first input for setting the threshold current to the laser, a second input for setting the enable current to the laser to produce a laser light output power level which is set to a precisely measured value, and a third input for modulating the laser light in accordance with line data input;

current monitor feedback means for measuring the current to the laser and for supplying feedback signals to the first input of the power means to set the threshold current; and light sensor feedback means for receiving light output measurements from the laser-light sensor and for supplying feedback signals to the second input of the power means to set within a range the enable current to the laser to produce a laser light output power level at the precisely measured level, such that all of the laser channels print uniformly in spite of variations from laser to laser and changes due to ageing.

9. The printer of claim 8 which further comprises a temperature compensated precision voltage reference source for all of the drive circuits.

10. A circuit in a multi-laser thermal printer for maintaining the full-on light output power of a respective laser within closely calibrated limits during the service life of the laser, the circuit comprising:

a semiconductor diode laser whose light output is controlled between off and full-on by drive currents;

power drive means for supplying drive currents to the laser in accordance with control signals;

D/A converter means for applying control signals to the power drive means, the D/A converter means having a bias level input and a line data input;

precision adjustable bias means for applying a precisely set bias level to the bias input of the converter means;

light sensor means for precisely measuring the light output power levels of the laser and for providing accurate data signals corresponding to the light power output levels; and feedback means for adjusting the precision bias means in accordance with data signals from the light sensor means, such that the bias of the D/A converter means is set at that value which for line data input to the converter means calling for full-on causes the power drive means to provide that full-on drive current to the laser which gives a calibrated full-on light power output of the laser as measured by the sensor means.

11. The circuit of claim 10 wherein the precision bias means is a digitally controlled potentiometer supplied with a highly stable and accurate reference voltage.

12. The circuit of claim 11 further comprising a plurality of the circuits for all of the respective lasers in the printer such that highly uniform printing is obtained from all of the lasers throughout their service lives.

13. The circuit of claim 11 wherein the feedback means further comprises a central processor unit which operates on the data signals from the sensor means and provides digital signals which precisely adjust the potentiometer.

* * * * *